March 11, 1958 W. T. K. BRYAN 2,826,114
BINOCULAR MICROSCOPES
Filed Sept. 1, 1954
FIG. 1.
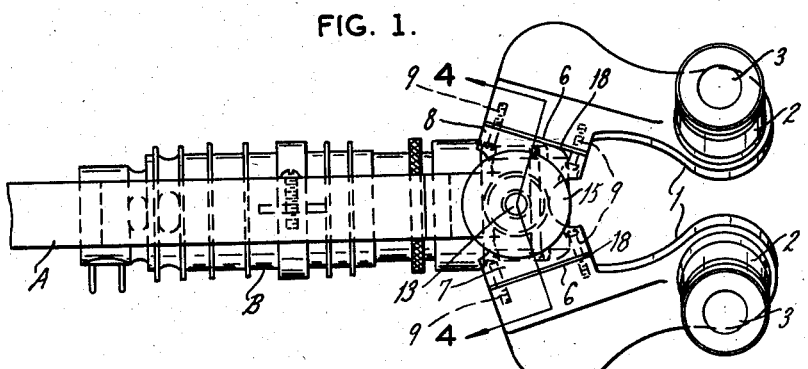
FIG. 2.
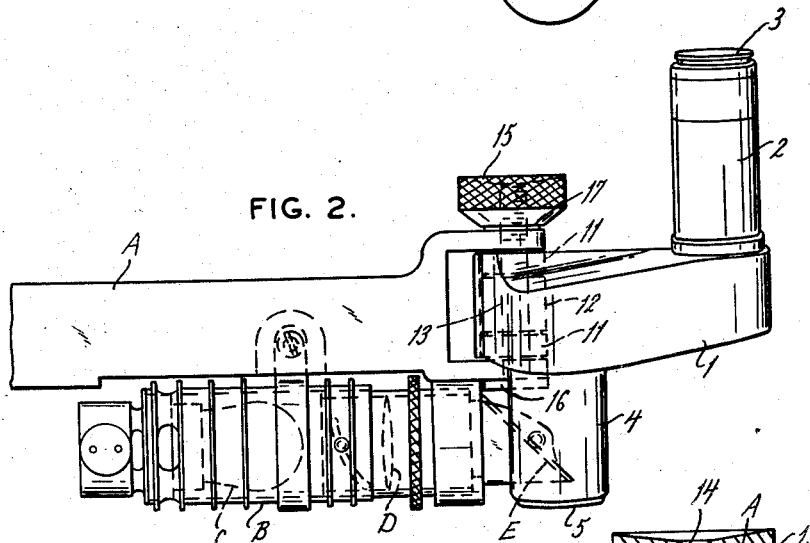
FIG. 3.
FIG. 4.
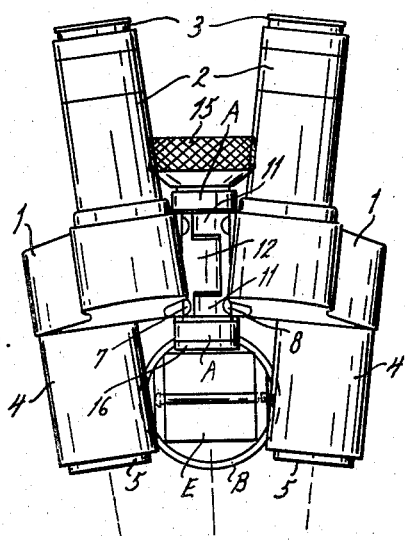
INVENTOR.
WILLIAM T. K. BRYAN
BY
ATTORNEY United States Patent Office 2,826,114
Patented Mar. 11, 1958

2,826,114
BINOCULAR MICROSCOPES
William T. K. Bryan, St. Louis, Mo.
Application September 1, 1954, Serial No. 453,504
4 Claims. (Cl. 88—39)

This invention relates to binocular microscopes of the character of dissecting microscopes. Such binocular microscopes are commonly used in the fields of medicine and biology, but they also have uses in industry, in the assembly and inspection of very small parts, for example, and while the illustrative embodiment of the microscope of this invention shown and described herein is referred to as a dissecting microscope and its use as such is particularly pointed out, it is to be understood that this invention has general application. This application is a continuation of application Serial No. 146,540, filed February 27, 1950, now abandoned.

One of the disadvantages of binocular dissecting microscopes known heretofore has been that when it has been attempted substantially to increase their working distance (for example, above six inches), the necessary supplementary prisms caused marked chromatic aberration, double vision, and generally distortion. The illumination provided in these microscopes also proved inadequate at the longer working distance. Thus, in fenestration surgery, for example, where instruments must be manipulated in a relatively narrow, deep cavity, it has been impossible to get the light, the lines of vision from the microscope and the operating instrument into the cavity at the same time.

One of the objects of this invention is to provide a binocular microscope with a working distance substantially greater than binocular microscopes known heretofore.

Another object is to provide such a binocular microscope in which the working distance of the lens system (the distance from the objective lens to the point of convergence of the optical axes at the plane of vision of the microscope) may easily be varied.

Another object is to provide such a binocular microscope in which the binocular angle (or angle of convergence) may be readily adjusted to the working distance of the lens system.

Another object is to provide such a binocular microscope in which the inter-ocular distance may readily be changed.

Still another object is to provide such a binocular microscope the field of which, at the greater working distance, is brightly and effectively illuminated.

Other objects will become apparent to those skilled in the art in the light of the following description and accompanying drawing.

In accordance with this invention, generally stated, a binocular microscope is provided which has an increased working distance as compared with binocular microscopes known heretofore. By way of illustration, a binocular microscope of this invention having a working distance of eight inches has been found convenient for use in operations in a mastoid cavity. The binocular microscope of the this invention is so constructed that the working distance of the lens system and the binocular angle of the instrument can easily be changed. The inter-ocular distance may be changed even while the instrument is in use.

The field of the microscope may be brightly illuminated by a beam of light projected from between the objective housings themselves.

In the drawing,

Figure 1 is a top plan view of an illustrative embodiment of binocular microscope constructed in accordance with this invention;

Figure 2 is a view in side elevation of the binocular microscope shown in Figure 1;

Figure 3 is a view in front elevation of the binocular microscope shown in Figures 1 and 2; and Figure 4 is an enlarged cross-sectional view taken along the line 4—4 of Figure 1, illustrating particularly the hinge and the adjusting mechanism of the illustrative embodiment of binocular microscope shown in Figures 1 through 3.

The illustrative embodiment of binocular microscope of this invention shown in the drawing is mounted on a support A. A housing B, containing a lamp C, and a lens D, is mounted along and beneath the support A. A reflector E, which may take the form of a reflecting prism, extends beyond the forward end of the support A and is so positioned with respect to the lamp C, and lens D, as to project a beam of light directly upon the work field without interfering in any way with the operation of the microscope, as will be explained hereinafter.

The microscope of this embodiment includes a pair of prism mountings 1 and 1', which are mirror images of one another. The corresponding elements of the two prism mountings have therefore been identified by identical reference numerals.

Each of the mountings 1 and 1' has an aperture at the forward end of its upper wall, into which is secured a tube or holder 2, having an ocular 3 mounted therein. At its opposite end the bottom wall of each prism mounting is apertured to receive a tube or holder 4, which has an objective 5 mounted therein. The optical axes of the two objectives 5 are downwardly convergent, meeting at a point. The objectives 5 are either removably mounted in their tubes 4, so that objectives of different powers may be interchanged therein, or are made adjustable with respect to the oculars. In either case, they permit the varying of the working distance from the objectives to the point of convergence of the optical axes of the objectives at the plane of vision. A prism (not shown) is positioned in each prism mounting in a manner common to binoculars.

Each of the prism mountings is provided near its rearmost end, with a plane faced boss 6, offset laterally inwardly from a line between the ocular housing 2 and the objective housing 4. A hinge part 7 is rigidly mounted on the boss 6 of the mounting 1, and a hinge part 8 is rigidly mounted on the boss 6 of the mounting 1' by means of two pairs of screws, an upper pair 9 and a lower pair 10. As most clearly seen in Figure 4, the hinge part 8 is recessed at its center section to provide a pair of horizontally extending knuckles 11. The hinge part 7 is cut away at top and bottom to provide spaces for the reception of the knuckles 11 and to provide a center knuckle 12 which fits into the space between the knuckles 11. The knuckles 11 and 12 have registering apertures through which a bolt 13 passes. The bolt 13 is screw-threaded at its upper end as shown at 14 for the reception of a knurled nut 15. The bolt 13 has a head 16 at its lower end, and washers 17 are positioned between the outboard faces of the knuckles 11 and the nut 15 and head 16. From this description it will be clear that when the nut 15 is loosened, the bolt 13 will act as a pintle upon which the hinge parts, hence the prism mountings, may be rotated.

An advantage of this kind of hinge construction lies in the fact that when the nut 15 is loosened just enough to permit movement of the mountings with a small but appreciable amount of effort, moving the mounting 1' will move both mountings at the same time, to scan a new area; while moving the mounting 1 will move that mounting with respect to mounting 1'. Thus, an adjustment either of the entire instrument or of the parts of the instrument with respect to one another may be accomplished with one hand.

In adapting the binocular angle to a chosen working distance as determined by the lens system, and adjusting the inter-ocular distance, the procedure is as follows. Supposing that the working distance is less than it has been, so that the angle of convergence of the optical axes of the objectives needs to be increased; to make the adjustment, the screws 9 and 10 are loosened (the screws 9 to a greater degree than the screws 10), so that the prism mountings may be moved away from the respective hinge parts 7 and 8 at their upper portions, and shims 18 are introduced in the upper of the resulting spaces between the prism mountings and the hinge parts 7 and 8. The screws 9 and 10 are tightened, which has the effect of holding the parts in the position shown in Fig. 4. With the prism mountings adjusted at this angle, the objectives are brought more closely together to focus upon a predetermined point closer to the objectives.

Should the working distance be greater, that is, should the angle of convergence of the optical axes of the objectives need to be decreased, the screws 9 and 10 are loosened (the screws 10 to a greater degree than the screws 9), and the shims 18 are introduced into the lower of the resulting spaces between the prism mountings and the hinge parts 7 and 8, instead of at the upper of these spaces, which has the effect of moving the objectives farther apart, and consequently bringing the fields of vision into coincidence at a point farther removed from the objectives. With the shims 18 thus positioned, the screws 9 and 10 are again tightened and the parts will remain in the adjusted position.

In order to adjust the inter-ocular distance, the nut 15 is loosened so that the prism mountings, consequently the oculars 3, may be swung apart or toward one another to approximately the desired inter-ocular distance, after which the bolt 15 is tightned to maintain the parts in this adjusted position.

While rotation of one of the mountings with respect to the other about the bolt 13 changes the inter-ocular distance, the distance between the objectives, hence the point of convergence of their optical axes, is changed only negligibly in the embodiment shown, because the objectives are positioned substantially at opposite ends of a common diameter, the center of which is the vertical axis of the bolt 13.

The angular movement of the mountings need be only small to accommodate differences in interpupillary distances of different operators. A movement of several millimeters of the oculars will produce a change of inter-objective distance of only a small fraction of a millimeter. The resultant difference in focus, at a working distance of eight inches, for example, is undetectable.

If the mountings are mounted on the support in such a way that the objectives may be swung toward and away from one another a substantial amount, as by hinging the mountings near the oculars rather than near the objectives, the accommodation for change in the working distance of the lens system may be made by changing the distance between the objectives. Taken in combination with the provision for canting the mountings, such an arrangement provides additional flexibility, particularly in adjusting the stereoscopic angle. Thus, for example, if a wide stereoscopic angle at a long working distance is desired, the objectives need only be moved apart to bring the point of convergence below the visual plane, and the mountings be given an additional cant to restore the point of convergence to the visual plane.

The objectives in the binocular microscope of this invention are far enough apart to permit the reflector to extend directly between them, and slightly above the lower ends of the housings 5. In this way, a beam of light may be projected directly upon the work field, without creating any aberration and without loss of definition, such as is frequently experienced in those coaxial illuminators in which a reflector is positioned within the tube of a microscope between the objective and the oculars. It is apparent that the arrangement of this invention has advantages of simplicity and efficiency over the illuminating arrangements known heretofore.

While an illustrative example of hinging and canting arrangements has been shown and described, it can be seen that numerous variations, within the scope of the appended claims, are possible, and will occur to those skilled in the art. For example, while the three knuckle hinge shown and described has certain advantages which have been described, other hinges, such as the two part hinge commonly used in binocular telescopes, or other equivalent arrangements may be used. So also, while the shimming arrangement shown and described is simple and effective, other ways of canting the mountings with respect to one another, such as by the use of set screws or a central ginglymus, between each hinge part and its prism mounting, will be readily apparent to those skilled in the art.

Having thus described the invention, what is claimed and desired to be secured by Letters Patent is:

1. A binocular microscope comprising a support bar and a pair of individual microscope units supported by one end of said bar, each of said microscope units comprising a prism mounting, an ocular tube extending from one face of said mounting in one direction and an objective tube extending from an opposite face of said mounting and in the other direction, the axes of the ocular and objective tubes of each unit being parallel but displaced from one another, and the axes of the objective tubes of the two units being convergent vertically; cooperating hinge elements on the respective prism mountings adjacent and offset laterally from their respective objective tubes, said hinge elements comprising horizontally extending arms on one element and a complementary horizontally extending central extension on the other element fitting between said arms, said arms and said extension having registering apertures extending vertically therethrough to receive a bolt mounted in one end of said support bar, said hinge elements being secured to an end of each prism mounting to provide for rotation of said microscope units about a common axis extending generally in the direction of the axes of said objective tubes, whereby manipulation of the unit carried by the hinge part having the arms serves to rotate both units and manipulation of the unit carried by the hinge part having the central extension serves to adjust the inter-ocular distance, means for adjusting the position of each of said prism mountings angularly to control the convergence angle between the vertical axes of said objective tubes and to accommodate the working distance of the objectives, and means for holding said prism mountings in adjusted position.

2. A binocular microscope comprising a support and a pair of individual microscope units carried by said support, each of said microscope units having a prism mounting mounted on said support, an objective extending from said prism mounting adjacent the place at which said prism mounting is mounted on said support, the optical axes of the objectives of the two units being convergent in a direction away from said prism mounting, and an ocular extending from said prism mounting at a place remote from the place at which said prism mounting is mounted on said support, said prism mountings being hinged for movement with respect to one another about an axis lying in a plane bisecting the angle of convergence of the optical axes of the objectives, said objectives being positioned symmetrically on opposite sides of and substantially on a diameter through said axis whereby movement of the prism mountings with respect to one another serves to vary the distance between the oculars without varying the point of convergence of the optical axes.

3. In a binocular microscope of the kind in which objectives providing various different working distances may be exchanged, the improvement comprising a support and a pair of individual microscope units carried by said support, each of said microscope units having a prism mounting mounted on said support, an objective extending from said prism mounting adjacent the place at which said prism mounting is mounted on said support, the optical axes of the objectives of the two units being convergent in a direction away from the prism mountings, an ocular extending from said prism mounting at a place remote from the place at which said prism mounting is mounted on said support, said prism mountings being hinged for movement with respect to one another about an axis lying in a plane bisecting the angle of convergence of the optical axes of the objectives, said objectives being positioned symmetrically on opposite sides of and substantially on a diameter through said axis, and means for tilting said microscope units with respect to one another and with respect to the hinge axis to vary the angle of convergence of the optical axes of the objectives to accommodate their working distance.

4. A binocular microscope comprising a support, a pair of individual microscope units hingedly carried by said support for rotation about a common hinge axis, each of said microscope units having an objective, the optical axes of said objectives converging along the hinge axis, and a light source positioned externally of said objectives and arranged to project a beam of light directly along the hinge axis.

References Cited in the file of this patent
UNITED STATES PATENTS

| | | |
|---|---|---|
| 962,929 | Straubel | June 28, 1910 |
| 1,022,340 | Steinle | Apr. 2, 1912 |
| 1,033,965 | Troppmann | July 30, 1912 |
| 1,272,214 | Camus | July 9, 1918 |
| 1,637,563 | Gary | Aug. 2, 1927 |
| 1,818,974 | Engelmann | Aug. 18, 1931 |
| 1,914,212 | Ott | June 13, 1933 |

FOREIGN PATENTS

| | | |
|---|---|---|
| 1,883 | Great Britain | of 1869 |
| 97,270 | Germany | June 2, 1898 |
| 843,312 | Germany | Jan. 19, 1953 |